United States Patent [19]

Romesburg

[11] Patent Number: 4,772,937
[45] Date of Patent: Sep. 20, 1988

[54] SKEW SIGNAL GENERATING APPARATUS FOR DIGITAL TV

[75] Inventor: Eric D. Romesburg, Indianapolis, Ind.

[73] Assignee: RCA Licensing Corporation, Princeton, N.J.

[21] Appl. No.: 32,261

[22] Filed: Mar. 31, 1987

[51] Int. Cl.$^4$ .................... H04N 5/213; H04N 5/95
[52] U.S. Cl. ............................. 358/19; 358/36; 358/167; 358/337
[58] Field of Search ............... 358/19, 167, 160, 36, 358/21 R, 320, 337

[56] References Cited

U.S. PATENT DOCUMENTS 4,638,360 1/1987 Christopher et al. ............... 358/148
4,667,240 5/1987 Willis ................................. 358/167

Primary Examiner—Tommy P. Chin
Attorney, Agent, or Firm—Paul J. Rasmussen; Eric P. Herrmann; Kenneth N. Nigon

[57] ABSTRACT

A divider divides down the output of a high frequency oscillator to generate a master clock signal MCS for the purposes of sampling an incoming composite video signal CVS. A skew measuring circuit latches the current state of the divider at a predetermined edge of every incoming horizontal sync signal pulse IHSSP to provide skew data representative of the timing or phase offset between the clock signal MCS and the incoming horizontal sync signal IHSS at the start of each new line of picture information.

8 Claims, 2 Drawing Sheets

SKEW SIGNAL GENERATING APPARATUS FOR DIGITAL TV

This invention relates to an apparatus for determining the phase of the sampling clock relative to the incoming horizontal sync signal IHSS in a digital television (TV) receiver.

BACKGROUND

In a digital TV receiver, a broadcast analog color video signal is applied to a conventional receiving antenna. The signal received by the antenna is processed by an analog tuner and intermediate frequency (IF) circuitry. A baseband composite video signal CVS from the IF circuitry is applied to an analog-to-digital (A/D) converter. The A/D converter develops digital representations of the analog, baseband composite video signal CVS in response to a sampling or master clock signal MCS. The digital samples are processed in digital circuits to appropriately condition the luminance Y and chrominance C components of the composite video signal CVS for application to the matrix circuits of the TV receiver. The Red (R), Green (G) and Blue (B) signals developed by the matrix circuits are converted back to the analog format for application to the display device.

For chroma demodulation, it is advantageous to set the frequency of the sampling clock signal MCS at four (4) times the color subcarrier rate $F_{SC}$, and to phase lock the 4 $F_{SC}$ clock signal to the color burst signal BS incorporated in the incoming composite video signal CVS. Sampling the chrominance signal using a 4 $F_{SC}$ burst locked clock (BLC) produces the following sample sequence: $-(B-Y), -(R-Y), (B-Y), (-R-Y), -(B-Y)$ and so on. Demodulation may be accomplished by merely demultiplexing the above sample sequence into separate R-Y and B-Y data streams.

However, for memory based features (e.g., pix-in-pix, freeze picture, zoom, recursive filtering, etc.), it is desirable to process the video signal with a line locked clock (LLC). A line locked clock produces a fixed integer number (e.g., 910 in the NTSC format) of sampling points per horizontal line. This simplifies memory based video features processing (e.g., line, field or frame memories), because the respective samples are vertically aligned (i.e., TV raster is orthogonally sampled).

For a standard NTSC video signal (e.g., broadcast TV signal), a sampling clock frequency, which is an even integer multiple of the color subcarrier frequency $F_{SC}$, contains a fixed integer number of clock pulses in every horizontal line period. The color subcarrier frequency $F_{SC}$ is established at 455/2 times the horizontal line frequency $F_H$ (i.e., $F_{SC}=(455/2)\cdot F_H$) in a standard NTSC TV Signal. A sampling clock frequency $F_{MCS}$ of 4 $F_{SC}$ has exactly 910 clock periods ($4\times 455/2$) in every horizontal line period. For a standard NTSC video signal, a clock signal may be concurrently burst locked and line locked, thereby facilitating both chroma demodulation and memory based applications (e.g., zoom).

However, not all NTSC compatible TV signals conform precisely to the NTSC standard format. For example, signals produced by a video cassette recorder (VCR) have varying horizontal line periods in the reproduced signal. This results in a variation in the number of clock pulses developed per horizontal line (e.g., 909.9, 910, 910.1, etc.). In general, for non-standard TV signals, it is not possible that a clock signal be simultaneously burst locked and line locked.

One previously known approach for processing non-standard TV signals in the digitial domain employs a burst locked clock. The use of a burst locked clock simplifies chroma demodulation. However, a burst locked clock produces a variation in the number of clock pulses per horizontal line, and, therefore, causes a line-to-line variation in the phase of the clock signal relative to the incoming horizontal synchronizing signal IHSS. The line-to-line timing or phase variation (i.e., skew errors) of the clock signal relative to the horizontal sync signal causes line-to-line misalignment of the picture elements (pixels) displayed on the TV screen, thereby requiring skew correction for memory-based features.

In order to compensate for the line-to-line misalignment of the pixels before they are written into the memory in a burst locked clock system, the input signal samples are time shifted or skew corrected for the phase differences between the incoming horizontal sync signal IHSS and the sampling clock signal MCS. Additionally, the signal samples read out from the memory are corrected for skew errors prior to their application to the matrix circuits of the TV receiver. U.S. Pat. No. 4,638,360, issued to Christopher, et al., and entitled "TIMING CORRECTION FOR A PICTURE-IN-PICTURE TELEVISION SYSTEM", describes illustrative circuitry, responsive to a skew signal SS, for correcting skew errors in the incoming and outgoing signals in a memory-based video signal processing system, which uses a burst locked clock.

Another approach for processing non-standard TV signals in the digital domain uses an asynchronous or free-running clock. An advantage of an asynchronous clock system is that complicated circuitry (e.g., including a voltage controlled oscillator or VCO) is not required for locking the phase of the clock signal with the color burst phase. However, an asynchronous clock system requires skew correction for memory-based features when non-standard video signals are processed. Another disadvantage of an asynchronous clock system is that chroma demodulation is more complicated.

A skew measuring circuit for determining the phase errors (also known as timing or skew errors) between the clock signal and the incoming horizontal sync signal IHSS is described in detail in a commonly-assigned, copending U.S. patent application Ser. No. 761,179, entitled "TIMING CORRECTION CIRCUITRY AS FOR TV SIGNAL RECURSIVE FILTERS", and filed in behalf of Willis, et al (now U.S. Pat. No. 4,667,240). An integral circuit (IC) wich includes a functionally similar skew measuring circuit is the Deflection Processor Unit (DPU2532) referred to in the ITT data book "DIGIT 2000 NTSC DOUBLE-SCAN VLSI DIGITAL TV SYSTEM", published by ITT Intermetall Semiconductors, Freiburg, W. Germany.

SUMMARY OF THE INVENTION

In accordance with this invention, an alternative circuit is described for providing skew data indicative of the phase error of the clock signal MCS relative to the incoming horizontal sync signal IHSS. A divider divides down a high frequency oscillator signal HFOS to generate the master clock signal MCS. A control circuit responsive to the incoming horizontal sync signal IHSS and the high frequency oscillator signal HFOS generates a control signal pulse CSP at the start of each new line. A state capturing circuit coupled to the divider and responsive to the control signal CS provides the skew data once every horizontal line. As previously indicated, the skew data is used for correcting phase or timing errors in memory-based systems in the manner described in the aforementioned U.S. Patent issued to Christopher et al. and U.S. patent patent issued to Willis, et al.

IN THE DRAWINGS

FIG. 1 is a block diagram representation of an apparatus for generating skew data in accordance with the principles of the present invention; and FIG. 2 illustrates the waveform diagrams useful in understanding the operation of the FIG. 1 skew data generating apparatus.

DETAILED DESCRIPTION

It is assumed that the incoming baseband video signal CVS nominally conforms to the NTSC standard format. Examples of signals conforming nominally to the NTSC standard format are video signals produced by a video cassette recorder (VCR) (hereinafter, non-standard video signals). It is further assumed that the desired, nominal clock frequency $F_{MCS}$ is four (4) times the color subcarrier frequency $F_{SC}$, which translates to 14.3 MHZ in the NTSC format.

It is well-known in the art that the NTSC video signal includes periodic horizontal and vertical synchronizing signals interposed between succesive lines and fields of picture information. Additionally, in order to allow the TV circuits to reconstruct the color subcarrier signal for the purposes of chroma demodulation, several cycles of the color subcarrier signal (known as the burst signal BS) are inserted into the composite video signal during the horizontal blanking intervals.

Figure 1:
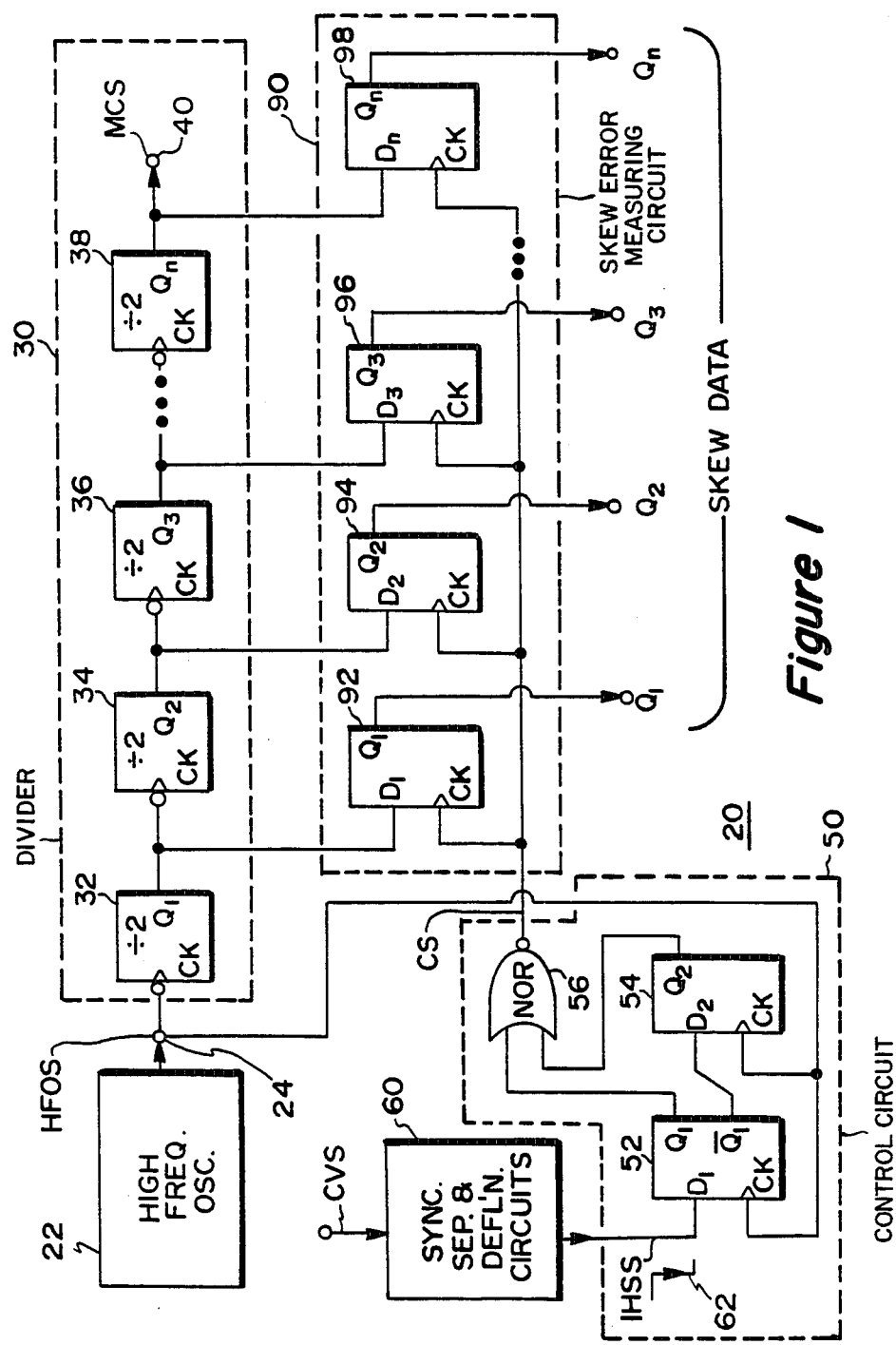

FIG. 1 depicts an apparatus 20 for generating a master clock signal MCS and the accompanying skew data in accordance with this invention. The FIG. 1 apparatus 20 includes a free running oscillator 22 for providing an asynchronous, fixed high frequency oscillatory signal HFOS. The frequency $F_{HFOS}$ of the free running oscillator 22 is established at a fixed integer multiple K (e.g., 32) of the desired nominal frequency (e.g., 4 $F_{SC}$) of the master clock signal MCS.

Although it is assumed herein that the oscillator 22 is free running, the subject invention is equally applicable to a burst locked oscillator. In that case, conventional circuitry (e.g., including a voltage controlled oscillator VCO) may be provided for locking the phase of the oscillatory signal HFOS to the phase of the burst signal BS included in the incoming composite video signal CVS.

The choice of the oscillator frequency $F_{HFOS}$ is determined by the timing resolution required for the picture elements and by the circuit designer's convenience. It is advantageous to establish the multiple K ($F_{HFOS}/4 \cdot F_{SC}$) equal to an integer power of two (i.e., $K=2^2$, where n is an integer) to simplify the circuit design (e.g., by allowing the use of a ripple counter configuration).

A frequency divide-by-K circuit 30 (hereinafter, divider) is coupled to the output terminal 24 of the oscillator 22 for generating the master clock signal MCS at an output terminal 40. The divider 30 comprises a plurality (n) of toggle flip-flops 32, 34, 36 and 38 connected in a ripple configuration.

The FIG. 1 apparatus 20 includes a circuit 50, responsive to the incoming horizontal sync signal IHSS and the high frequency oscillatory signal HFOS, for generating a control signal CS. The horizontal sync signal IHSS is a continuous time analog signal derived from the phase locked loop portion of conventional sync separator and deflection circuits 60 of the TV receiver.

The control circuit 50 includes a pair of D flilp-flops 52, 54 and a NOR gate 56. The clock inputs of the flip-flops 52 and 54 are coupled for receiving the high frequency oscillatory signal HFOS. The incoming analog horizontal sync signal IHSS is applied to the data input of the first flip-flop 52. The $\overline{Q}_1$ output of the first flip-flop 52 is applied to the data input of the second flip-flop 54. The outputs $Q_1$ and $Q_2$ of the flip-flops 52 and 54 are applied to the respective input terminals of the NOR gate 56.

Figure 2:
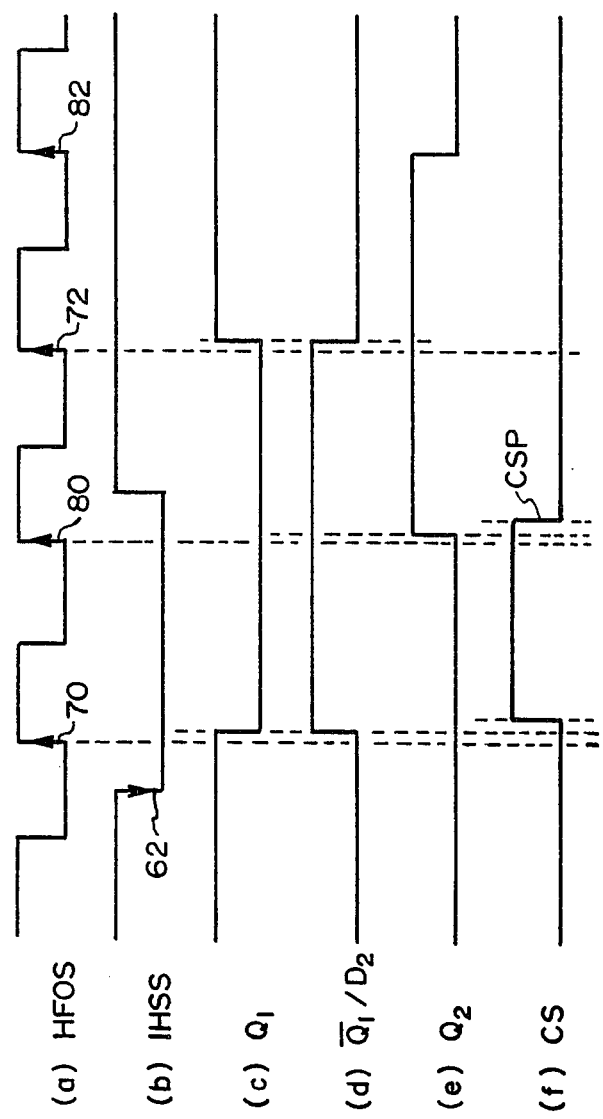

The operation of the control circuit 50 will be explained in conjunction with the FIG. 2 waveforms. When the data terminal of the flip-flop 52 becomes a logical zero (waveform 2.b), the output $Q_1$ thereof goes from a logical one to a logical zero (waveform 2.c) at the occurrence of the next positive going edge 70 of the high frequency oscillator signal HFOS (waveform 2.a). The output $Q_1$ of the flip-flop 52 remains a logical zero as long as its data input is biased at a logical zero. The output $Q_1$ of the flip-flop 52 goes back to a logical one state (waveform 2.c) in response to the very first positive going edge 72 occurring after the data input of the flip-flop 52 is biased at a logical one state.

The output $Q_2$ of the second flip-flop 54 goes from a logical zero state to a logical one state (waveform 2.e) in response to the first positive going edge 80 occurring after the data input $\overline{Q}_1/D_2$ thereof becomes a logical one (waveform 2.d). The output $Q_2$ becomes a logical zero (waveform 2.e) in response to the very next positive going edge 82 occurring after the data input $\overline{Q}_1/D_2$ of the flip-flop 54 is biased at a logical zero state.

The NOR gate 56 produces a control signal pulse CSP (waveform 2.f) when both inputs $Q_1$ and $Q_2$ are simultaneously low. Thus, the control circuit 50 outputs a pulse CSP following the occurrence of a predetermined edge 62 (e.g., a negative going edge) of the continuous time horizontal sync signal pulse IHSSP at the start of each new line of picture information.

The skew measuring circuit 90 comprises an equal plurality (n) of D flip-flops 92, 94, 96 and 98 having their data inputs coupled for receiving the respective outputs $Q_1, Q_2, Q_3, \ldots Q_n$ of the first set of flip-flops 32-38, and having their clock inputs coupled for receiving the control signal CS. THe second set of flip-flops 92-98 latch the current divider state at the beginning of each new line of picture information in response to a predetermined edge (e.g., positive going edge) of the control signal CS. The outputs $Q_1, Q_2, Q_3 \ldots Q_n$ of the second set of flip-flops 92-98 represent the skew data indicative of the timing or phase error between the clock signal MCS and the incoming horizontal sync signal IHSS at the start of each new horizontal line.

As previously indicated, the skew correction circuits (of the type described in the afore-mentioned Willis et al. patent application and the Christopher et al. patent) correct timing or phase errors in the video signals written into the memory and read out therefrom in response to the skew data provided by the skew measuring circuit 90 of the subject invention. It is believed that the subject skew measuring circuit 90 is relatively simple in construction and cost effective.

What is claimed is:

1. An apparatus for measuring a phase or skew error comprising:

a source of an incoming composite video signal CVS including a periodic horizontal sync signal IHSS disposed between successive horizontal lines of picture information; said composite video signal CVS being in the form of a stream of digital samples occurring synchronously with a master clock signal MCS having a frequency $F_{MCS}$;

an oscillator for providing a high frequency signal HFOS having a nominal frequency which is a fixed integer multiple K of said master clock signal frequency $F_{MCS}$;

a frequency divide-by-K circuit (hereinafter divider), including a first set of flip-flops, having an input terminal coupled for receiving said high frequency oscillator signal HFOS and having an output terminal at which said master clock signal MCS is provided;

means responsive to said incoming horizontal sync signal IHSS and said high fixed frequency oscillator signal HFOS for generating a control signal CS once every horizontal line; and state capturing means coupled to said divider and responsive to said control signal CS for capturing respective states of said first set of flip-flops once every horizontal line; said respective states of said first set of flip-flops being indicative of said phase or skew error.

2. Apparatus defined in claim 1 wherein said state capturing means comprises a second set of flip-flops (a) having their data inputs coupled for receiving the respective outputs of said first set of flip-flops, (b) having their clock inputs coupled for receiving said control signal, and (c) having said skew error at the output terminals thereof.

3. Apparatus defined in claim 2 wherein said frequency of said high frequency oscillator signal HFOS is an integer power-of-two multiple ($K=2^n$, where n is an integer) of said frequency $F_{MCS}$ of said master clock signal MCS; wherein said divider comprises n flip-flop circuits connected in a ripple configuration.

4. Apparatus defined in claim 2 wherein said control signal generating means comprises of a pair of flip-flops and a NOR gate; the clock inputs of said pair of flip-flops being coupled for receiving said high frequency oscillator signal HFOS; the data input of the first one of said pair of flip-flops being coupled for receiving said incoming horizontal sync signal IHSS; the data input of the second one of said pair of flip-flops being coupled for receiving the $\overline{Q}$ output of said first flip-flop; said NOR gate having a pair of input terminals coupled for receiving Q outputs of said pair of flip-flops, and having an output terminal at which said control signal CS is available.

5. Apparatus defined in claim 1 wherein said frequency $F_{MCS}$ of said master clock signal MCS is equal to four times the frequency of a color subcarrier burst signal BS included in said composite video signal CVS.

6. Apparatus defined in claim 5 wherein said high frequency oscillator HFOS is 32 times said master clock frequency $F_{MCS}$.

7. Apparatus defined in claim 1 wherein said oscillator is free running.

8. Apparatus defined in claim 1 wherein the phase of said high frequency oscillator signal HFOS is locked to the phase of a color subcarrier burst signal BS included in said incoming composite video signal CVS.

* * * * *